United States Patent
Gonzalez Prieto et al.

(10) Patent No.: US 12,511,214 B2
(45) Date of Patent: Dec. 30, 2025

(54) MANAGED ENTITY CONFIGURATOR ANOMALY DETECTION

(71) Applicant: Microsoft Technology Licensing, LLC, Redmond, WA (US)

(72) Inventors: Alberto Gonzalez Prieto, San Jose, CA (US); Tommaso Pimpo, Duval, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/855,616

(22) PCT Filed: Apr. 12, 2023

(86) PCT No.: PCT/US2023/018286
§ 371 (c)(1),
(2) Date: Oct. 9, 2024

(87) PCT Pub. No.: WO2023/205012
PCT Pub. Date: Oct. 26, 2023

(65) Prior Publication Data
US 2025/0117304 A1 Apr. 10, 2025

(30) Foreign Application Priority Data
Apr. 20, 2022 (LU) .......................... 501875

(51) Int. Cl.
*G06F 11/00* (2006.01)
*G06F 11/30* (2006.01)
*H04L 41/12* (2022.01)

(52) U.S. Cl.
CPC .......... *G06F 11/3048* (2013.01); *H04L 41/12* (2013.01)

(58) Field of Classification Search
CPC ............. G06F 11/3048; G06F 11/0721; G06F 11/079; G06F 11/2247; G06F 11/2252; G06F 11/2257; G06F 11/2263
See application file for complete search history.

(56) References Cited

U.S. PATENT DOCUMENTS

| | | | |
|---|---|---|---|
| 2012/0106367 A1* | 5/2012 | Barkol | G06F 16/9027 370/252 |
| 2014/0189086 A1 | 7/2014 | Chattopadhyay et al. | |
| 2015/0304349 A1 | 10/2015 | Bernstein et al. | |

OTHER PUBLICATIONS

Search Report and Written Opinion received for PCT Application No. LU501875 (MS#411112-LU01), Jan. 25, 2023, 10 pages.
(Continued)

*Primary Examiner* — Katherine Lin
(74) *Attorney, Agent, or Firm* — Workman Nydegger

(57) ABSTRACT

Detecting an anomalous configurator of a plurality of managed entities. A plurality of configuration trees, each representing configuration parameters at a corresponding managed entity, include annotations that identify a configurator that configured each parameter. For a particular configurator, a plurality of subtrees is generated from the plurality of configuration trees. A set of weighted edit distances are calculated from the plurality of subtrees, each representing a degree of difference between a different pair of subtrees. A distance matrix is populated with the set of weighted edit distances, and the distance matrix is used to identify anomalous subtree(s) within the plurality of subtrees for the particular configurator. In embodiments, a configuration corresponding to an anomalous subtree considered to have been anomalously applied by the particular configurator. Data that identifies at least one managed entity associated with the anomalous subtree, and the particular configurator is stored.

20 Claims, 11 Drawing Sheets

(56) References Cited

OTHER PUBLICATIONS

International Search Report and Written Opinion received for PCT Application No. PCT/US23/018286 (MS#411112-PCT01), Jun. 1, 2023, 14 pages.
Communication under Rule 71(3) EPC, Received for European Application No. 23720210.6, mailed on May 8, 2025, 7 pages.
Decision to grant a European patent pursuant to Article 97(1) received for European Application No. 23720210.6, mailed on Aug. 21, 2025, 2 Pages.
First Office Action Received for Chinese Application No. 202380031500.9, mailed on Sep. 20, 2025, 08 Pages (English Translation Provided).

* cited by examiner

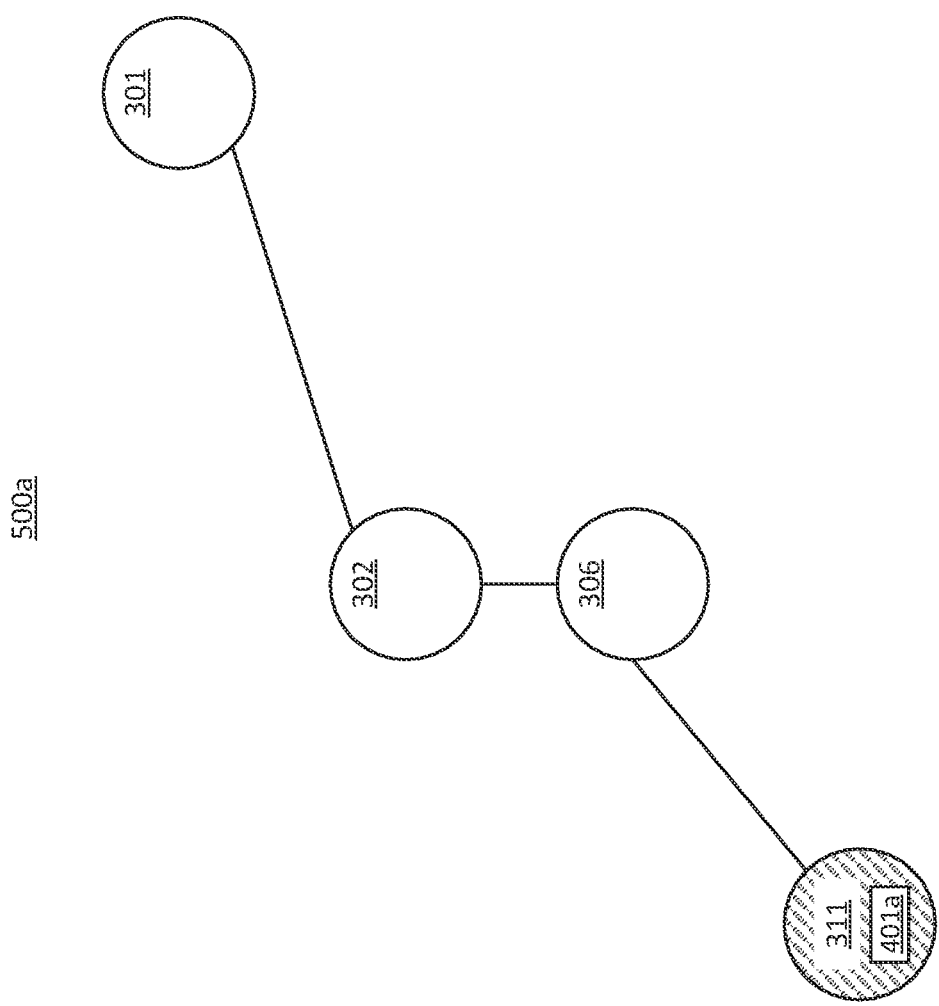

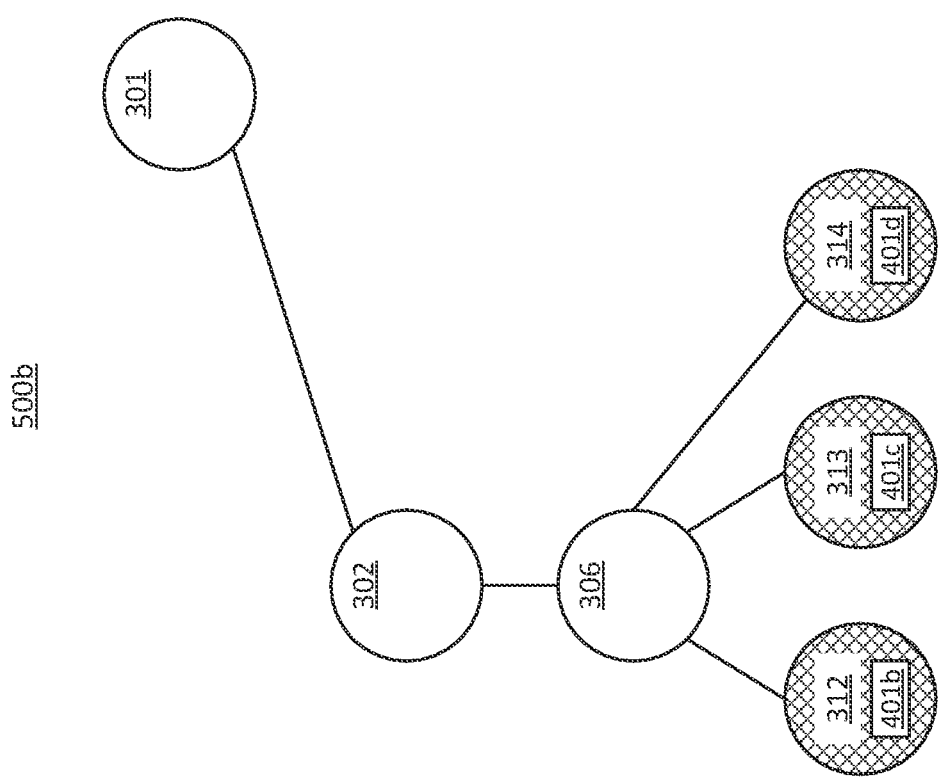

| | 601 | 602 | 603 | 604 | 605 | 606 |
|---|---|---|---|---|---|---|
| 601 | 0 | 801 | 802 | 803 | 804 | 805 |
| 602 | 801' | 0 | 806 | 807 | 808 | 809 |
| 603 | 802' | 806' | 0 | 810 | 811 | 812 |
| 604 | 803' | 807' | 810' | 0 | 813 | 814 |
| 605 | 804' | 808' | 811' | 813' | 0 | 815 |
| 606 | 805' | 809' | 812' | 814' | 815' | 0 |

MANAGED ENTITY CONFIGURATOR ANOMALY DETECTION

CROSS-REFERENCE TO RELATED APPLICATIONS

The present application is a U.S. National Stage of International Application No. PCT/US2023/018286, filed on 12 Apr. 2023, designating the United States and claiming the priority of Luxembourg Patent Application No. LU501875 filed with the Luxembourg Intellectual Property Office on 20 Apr. 2022. All of the aforementioned applications are incorporated herein in their respective entirety by this reference.

TECHNICAL FIELD

The present disclosure relates to systems, methods, and devices that detect anomalies relating to configurators of managed entities.

BACKGROUND

Computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. As computer networks have proliferated and become more complicated, various mechanisms have been developed to manage the entities (e.g., switches, routers, computers, etc.) within those computer networks. As a result, it is common for a given managed entity to be configured using more than one configurator tool. For instance, during deployment of a switch, that switch may be initially provisioned by a first configurator operated by a network administrator. Later, various setting of the switch may be dynamically modified by a variety of other configurators—for example, configuration of virtual routing and forwarding (VRF) settings on a switch may be managed by a different set of configurators than are used for configuration of simple network management protocol (SNMP) settings.

While it can be convenient to allow multiple configurators to configure a managed entity, this can lead to challenges because configurators can unintendedly overwrite each other, leading to undesired configuration states on those managed entities.

BRIEF SUMMARY

The embodiments described herein identify anomalies in configurations applied by multiple configurators to a set of software-configurable managed entities. In embodiments, the anomaly detection described herein includes annotating a set of configuration trees, with each configuration tree representing at least a subset of a configuration of a managed entity. In embodiments, annotating each configuration tree includes tagging one or more parameters represented by the configuration tree with information that identifies, or is usable to identify, a configurator that modified that parameter. Thus, for each managed entity that was configured by more than one configurator, its corresponding annotated configuration tree can be used to determine which configurator applied which configuration setting(s).

In embodiments, for a selected configurator, the anomaly detection described herein includes generating a set of subtrees from the set of annotated configuration trees, with each subtree being generated from a corresponding configuration tree and including the parameter(s) that were annotated in that configuration tree as being modified by the selected configurator. Thus, for the selected configurator, the set of subtrees represents which parameter(s) were configured by that configurator, across the set of managed entities. This subtree generation process can be repeated for each of a plurality of configurators, such that a different set of subtrees is generated for each configurator.

In embodiments, the anomaly detection described herein includes using the set of subtrees for a subject configurator to determine which configuration(s) applied by that configurator were anomalous at one or more of the managed entities. In embodiments, this includes calculating a weighted edit distance for each pairing of subtrees in the set of subtrees for the subject configurator, populating a distance matrix with those edit distances, and then using the distance matrix to determine if any subtree in the set has an edit distance that is anomalous compared to the other subtrees in the set. For each subtree that is identified as anomalous, a data structure is generated indicating that the subject configurator may have applied an anomalous configuration to a managed entity associated with the subtree.

Accordingly, the embodiments herein address technical challenges that arise when managing advanced networks, such as those found in data centers, including being able to detect when configurators have overwritten each other. A technical effect of the embodiments herein is the identification of a configurator that has applied an anomalous configuration to a managed entity within a network, which can be used to alert a network administrator of the anomaly and/or take a remedial action in view of the anomaly. Anomaly detections enable network administrators to remedy the cause of the anomaly, to avoid future anomalies, and to correct any undesired configuration state that resulted from the anomaly. This improves the functioning of the network by identifying and eliminating faults, enables network services to remain available and functioning properly, and improves the experience of network users.

In some aspects, the techniques described herein relate to a method, implemented at a computer system that includes a processor, for detecting an anomalous configurator of a plurality of managed entities, the method including: identifying a plurality of configuration trees that each uses a hierarchical set of nodes to represent a set of configuration settings that has been applied to a corresponding managed entity in the plurality of managed entities, each configuration tree identifying one or more parameters that are annotated with information identifying a configurator that configured the parameter, the configurator being selected from among a plurality of configurators of the plurality of managed entities; based on a particular configurator of the plurality of configurators, generating a plurality of subtrees from the plurality of configuration trees, each subtree corresponding to a different configuration tree in the plurality of configuration trees and representing one or more configuration settings that were applied by the particular configurator; calculating a set of weighted edit distances from the plurality of subtrees, each weighted edit distance representing a degree of difference between a different pair of subtrees in the plurality of subtrees, each weighted edit distance being weighted based at least on a decreasing function of node depth within at least one subtree; populating a distance matrix with the set of weighted edit distances; using the distance matrix, identifying one or more anomalous subtrees within the plurality of subtrees; and based on identifying the one or more anomalous subtrees within the plurality of subtrees, storing a data structure that identifies at least (a) at least one of the one or more managed entities associated with the one or more anomalous subtrees, and (b) the particular configurator.

In some aspects, the techniques described herein relate to a computer system for detecting an anomalous configurator of a plurality of managed entities, including: a processor; and a computer storage media that stores computer-executable instructions that are executable by the processor to cause the computer system to at least: identify a plurality of configuration trees that each uses a hierarchical set of nodes to represent a set of configuration settings that has been applied to a corresponding managed entity in the plurality of managed entities, each configuration tree including one or more parameters that are annotated with information identifying a configurator that configured the parameter, the configurator being selected from among a plurality of configurators of the plurality of managed entities; based on a particular configurator of the plurality of configurators, generate a plurality of subtrees from the plurality of configuration trees, each subtree corresponding to a different configuration tree in the plurality of configuration trees and representing one or more configuration settings that were applied by the particular configurator; calculate a set of weighted edit distances from the plurality of subtrees, each weighted edit distance representing a degree of difference between a different pair of subtrees in the plurality of subtrees, each weighted edit distance being weighted based at least on a decreasing function of node depth within at least one subtree; populate a distance matrix with the set of weighted edit distances; using the distance matrix, identify one or more anomalous subtrees within the plurality of subtrees; and based on identifying the one or more anomalous subtrees within the plurality of subtrees, store a data structure that identifies at least (a) at least one of the one or more managed entities associated with the one or more anomalous subtrees, and (b) the particular configurator.

In some aspects, the techniques described herein relate to a computer storage media that stores computer-executable instructions that are executable by a processor to cause a computer system to at least: identify a plurality of configuration trees that each uses a hierarchical set of nodes to represent a set of configuration settings that has been applied to a corresponding managed entity in the plurality of managed entities, each configuration tree including one or more parameters that are annotated with information identifying a configurator that configured the parameter, the configurator being selected from among a plurality of configurators of the plurality of managed entities; and based on a particular configurator of the plurality of configurators, generate a plurality of subtrees from the plurality of configuration trees, each subtree corresponding to a different configuration tree in the plurality of configuration trees and representing one or more configuration settings that were applied by the particular configurator; calculate a set of weighted edit distances from the plurality of subtrees, each weighted edit distance representing a degree of difference between a different pair of subtrees in the plurality of subtrees, each weighted edit distance being weighted based at least on a decreasing function of node depth within at least one subtree; populate a distance matrix with the set of weighted edit distances; using the distance matrix, identify one or more anomalous subtrees within the plurality of subtrees; and based on identifying the one or more anomalous subtrees within the plurality of subtrees, store a data structure that identifies at least (a) at least one of the one or more managed entities associated with the one or more anomalous subtrees, and (b) the particular configurator.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 5A-5D illustrate examples of configurator-specific subtrees generated from the annotated configuration tree of FIG. 4;

FIG. 8 illustrates an example of a distance matrix.

DETAILED DESCRIPTION

Figure 1:
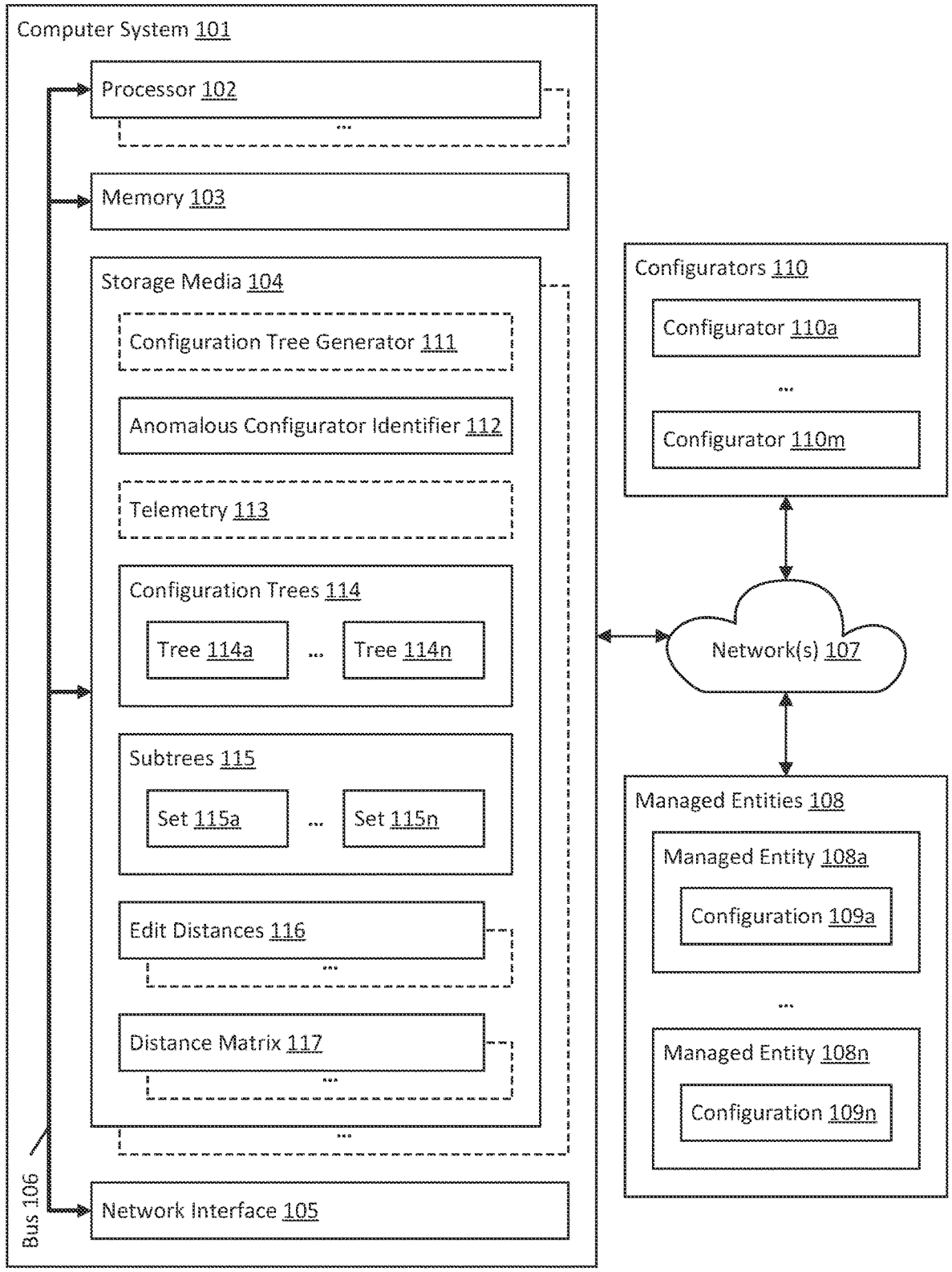
FIG. 1 illustrates an example computer architecture that facilitates anomaly detection for managed entity configurators.

FIG. 1 illustrates an example computer architecture 100 that facilitates anomaly detection for managed entity configurators. As shown, computer architecture 100 includes a computer system 101 comprising a processor 102 (or a plurality of processors), a memory 103, one or more computer storage media (storage media 104), and a network interface 105, all interconnected by a bus 106. As shown, the network interface 105 communicates via network(s) 107, which connects to managed entities 108 (i.e., managed entity 108a to managed entity 108n) and configurators 110 (i.e., configurator 110a to configurator 110m).

In embodiments, each of managed entities 108 is a computing device whose configuration is modifiable via software. In various examples, managed entities 108 can comprise switches, routers, computers, and the like. In computer architecture 100, the configurators 110 are used to apply configuration settings to managed entities 108, such as by modifying hardware, software, and/or firmware configuration parameters. Thus, as shown, each of managed entities 108 comprises a corresponding configuration (e.g., configuration 109a for managed entity 108a, configuration 109n for managed entity 108n).

In embodiments, more than one configurator of configurators 110 is enabled to apply configuration settings to a given managed entity of managed entities 108. For example, if managed entity 108*a* is a switch, then one configurator (e.g., configurator 110*a*) may apply initial provisioning settings to the switch, and one or more other configurators (e.g., configurator 110*m*) may later dynamically modify portions of the switch's configuration during its operation (e.g., to modify VRF settings, to modify SNMP settings). Thus, the configuration 109*a* of managed entity 108*a* may be modified at various times by various configurators of configurators 110. As a result, unintendedly, one or more of the configurators 110 may modify the same settings within configuration 109*a*, leading to undesired configuration states on managed entity 108*a*. While the configurators 110 are shown as being separate from the managed entities 108, in embodiments a configurator may be integral to a managed entity (e.g., a local console of the managed entity).

In embodiments, computer system 101 is configured to detect when one or more configurators of configurators 110 have made anomalous configuration settings changes within managed entities 108, and to generate data that can be used to alert an administrator of computer architecture 100 about detected anomalies. Thus, computer system 101 enables network administrators to remedy the cause of the anomaly and avoid future anomalies (e.g., by correcting a configuration of the configurators 110), and to correct any undesired configuration state that resulted from the anomaly (e.g., by correcting an anomalously applied configuration within the managed entities 108). This improves the functioning of computer architecture 100 by identifying and eliminating faults caused by the configurators 110, enables network services (e.g., provided by managed entities 108) to remain available and functioning properly, and improves the experience of network users (e.g., clients of managed entities 108).

Figure 2:
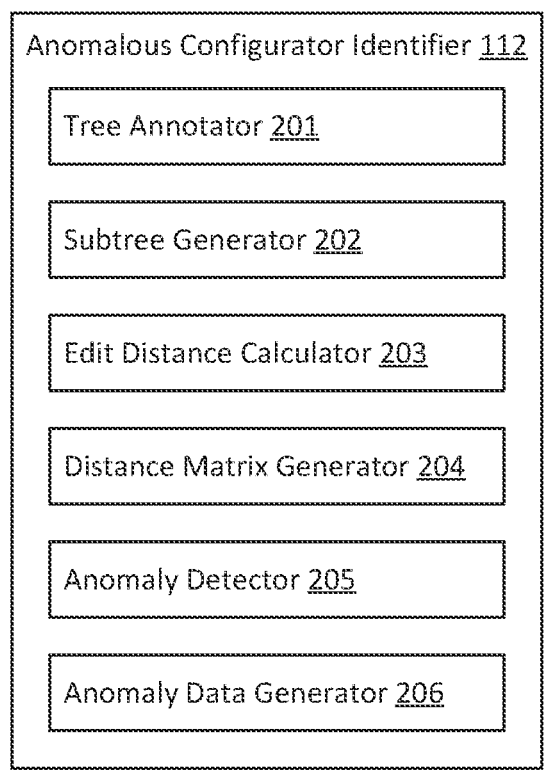
FIG. 2 illustrates an example of an anomalous configurator identifier.

The storage media 104 is illustrated as storing computer-executable instructions implementing at least an anomalous configurator identifier 112, and FIG. 2 illustrates an example 200 of components of the anomalous configurator identifier 112. Each component of the anomalous configurator identifier 112 depicted in FIG. 2 represents various functionalities that the anomalous configurator identifier 112 might implement in accordance with various embodiments described herein. It will be appreciated, however, that the depicted components—including their identity and arrangement—are presented merely as an aid in describing various embodiments of the anomalous configurator identifier 112.

In embodiments, the anomalous configurator identifier 112 operates based on configuration trees 114 (e.g., configuration tree 114*a* to configuration tree 114*n*, shown as residing in storage media 104, in one embodiment) generated by a configuration tree generator 111. In FIG. 1, the configuration tree generator 111 is illustrated as being separate from the anomalous configurator identifier 112, but in some embodiments the configuration tree generator 111 a component of the anomalous configurator identifier 112. In embodiments, the configuration tree generator 111 may even be separate from computer system 101, such that the configuration trees 114 are received via the network(s) 107 from one or more other computer systems.

In embodiments, the configuration tree generator 111 generates a different configuration tree for each managed entity in managed entities 108. In embodiments, the configuration tree generator 111 generates each configuration tree based on telemetry (e.g., telemetry 113, shown as optionally residing in storage media 104) received from a corresponding managed entity in managed entities 108 that represents at least a portion of that manage entity's configuration. Thus, in an example, configuration tree 114*a* corresponds to managed entity 108*a* and represents at least a portion of configuration 109*a*, and configuration tree 114*n* corresponds to managed entity 108*n* and represents at least a portion of configuration 109*n*.

In some embodiments, the telemetry 113 comprises a hierarchical data model, and the configuration tree generator 111 generates a configuration tree from the telemetry for a given managed entity after that model. The data model can be based on explicit data modeling languages (like Yang) or on implicit ones, like a command-line interface (CLI). For CLI, the nodes represent CLI keywords and parameters. In embodiments, each configuration tree represents the configuration state of a corresponding managed entity at a given time, such that the configuration tree is a snapshot of that managed entity's configuration state. In an example in which a managed entity is a networking device (e.g., switch, router), a configuration tree may represent the output of a "show running-config" command issued at that networking device.

Figure 3:
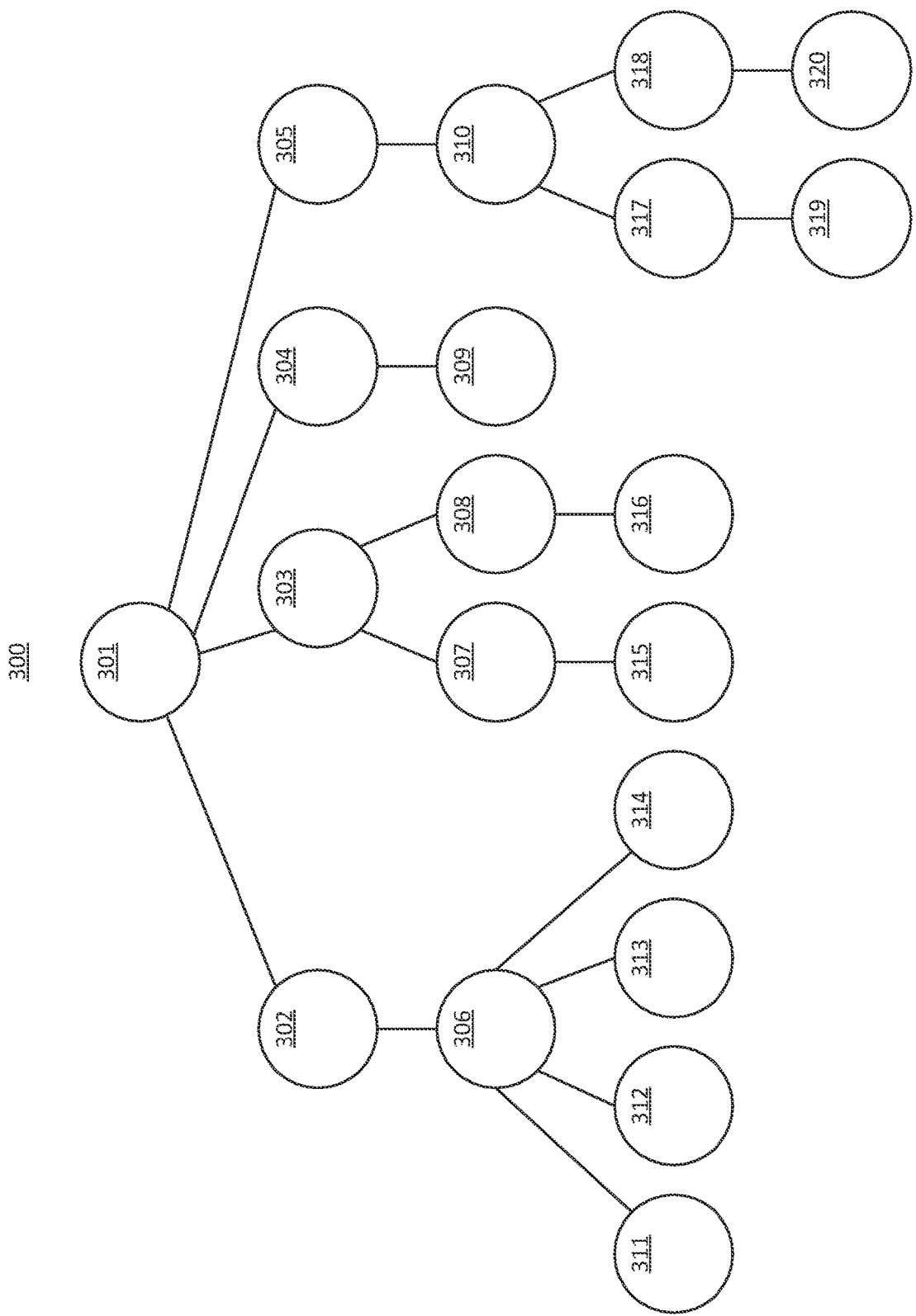
FIG. 3 illustrates an example of a configuration tree.

FIG. 3 illustrates an example 300 of a configuration tree. In example 300, the configuration tree comprises a plurality of nodes, including a root node 301; intermediary nodes 302-308, 310, 317, and 318; and leaf nodes 309, 311-316, 319, and 320. In embodiments, intermediary nodes represent features and sub-features, and leaf nodes represent parameters (e.g., for the features/sub-features). For example, in example 300, if the configuration tree represents the configuration of a switch, intermediary node 302 may represent the feature "VRF" where VRF denotes virtual routing function; intermediary node 306 may represent the sub-feature "Instance"; and leaf nodes 311-314 may represent the parameters 1-4, respectively (i.e., instance numbers). Additionally, in example 300, if the configuration tree represents the configuration of a switch, intermediary node 303 may represent the feature "SNMP" where SNMP denotes Simple Network Management Protocol; intermediary nodes 307 and 308 may represent the sub-features "iface" and "enable", respectively; and leaf nodes 315 and 316 may represent the parameters Mgm1 and traps, respectively.

In embodiments, using a tree annotator 201, the anomalous configurator identifier 112 annotates each configuration tree in at least a subset of the configuration trees 114 with information identifying which configurator of configurators 110 modified at least a subset of parameters represented by the configuration tree. While the tree annotator 201 could annotate existing configuration trees (e.g., generated the configuration tree generator 111), in embodiments the tree annotator 201 operates in conjunction with generation of each configuration tree to annotate the configuration tree during its generation. Notably, it is possible that there could be a configuration tree that lacks any represented parameter (e.g., if the corresponding managed entity has an empty configuration). In this case, the anomalous configurator identifier 112 refrains from considering that configuration tree.

In some embodiments, annotations include a user (e.g., of a configurator) that applied the configuration, the location (e.g., a remote networking device address, a local console connection, etc.) from where the configuration was applied, and the like. In various embodiments, information for these annotations is derived from the telemetry 113, from logs obtained from the configurators 110, and the like.

Figure 4:
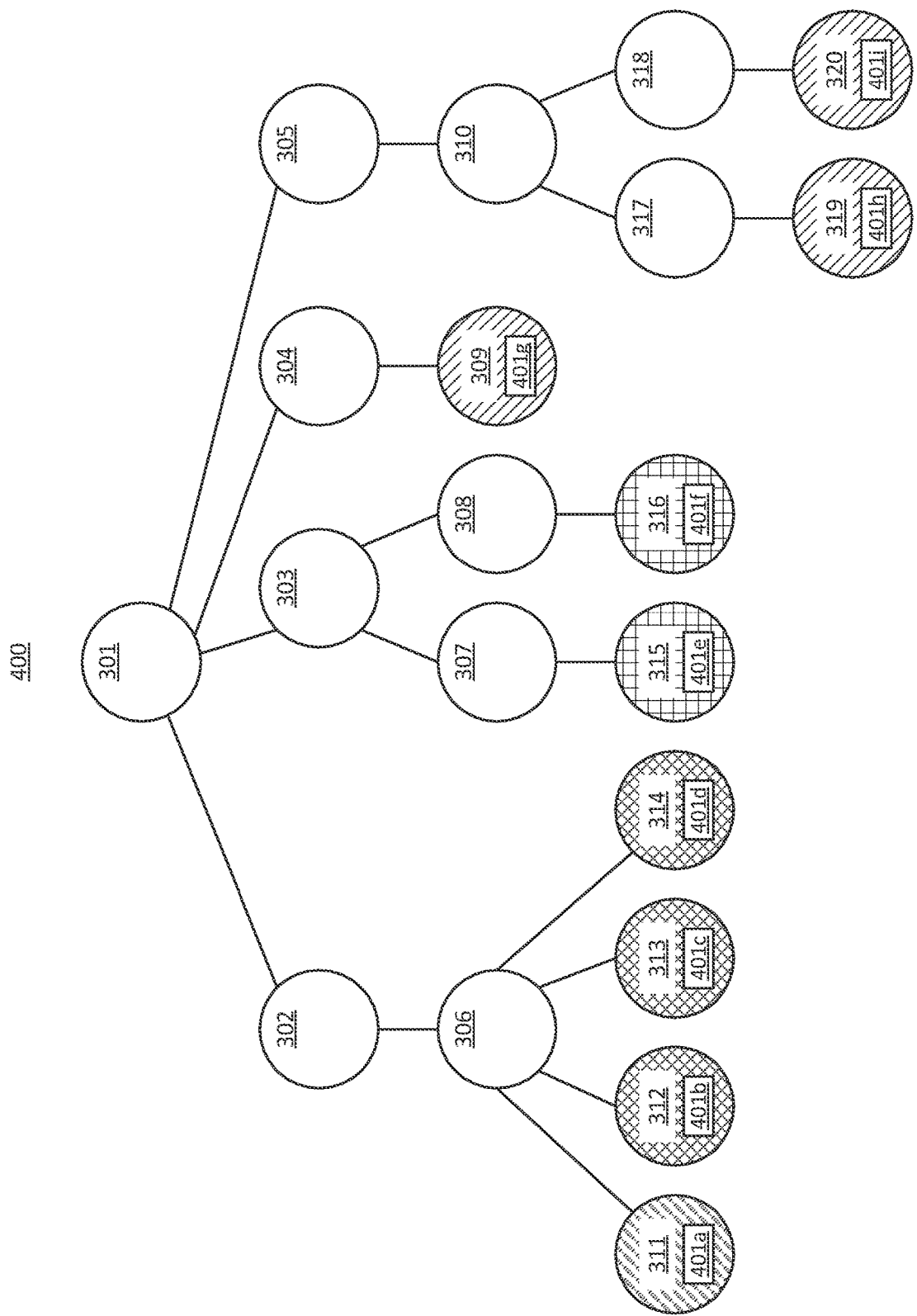
FIG. 4 illustrates an example of an annotated configuration tree.
Figure 5C:
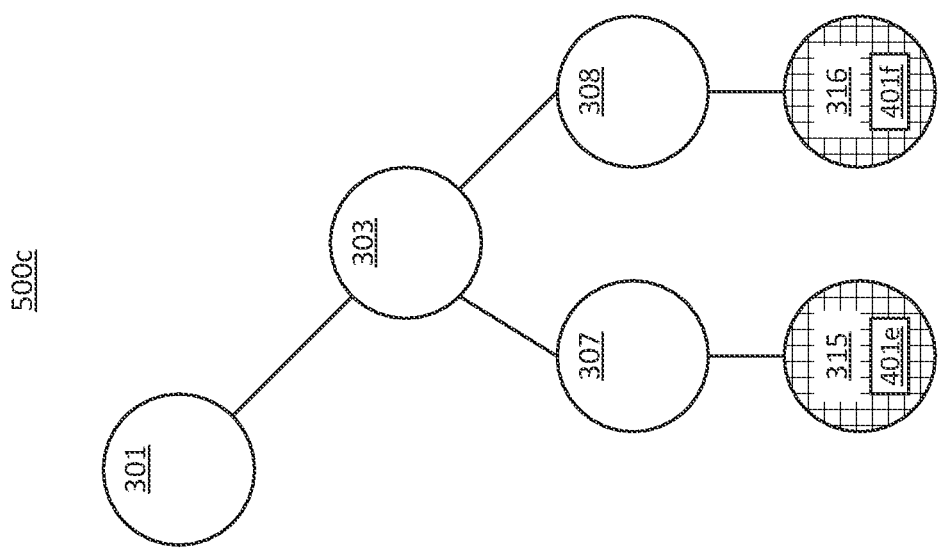
Figure 5D:
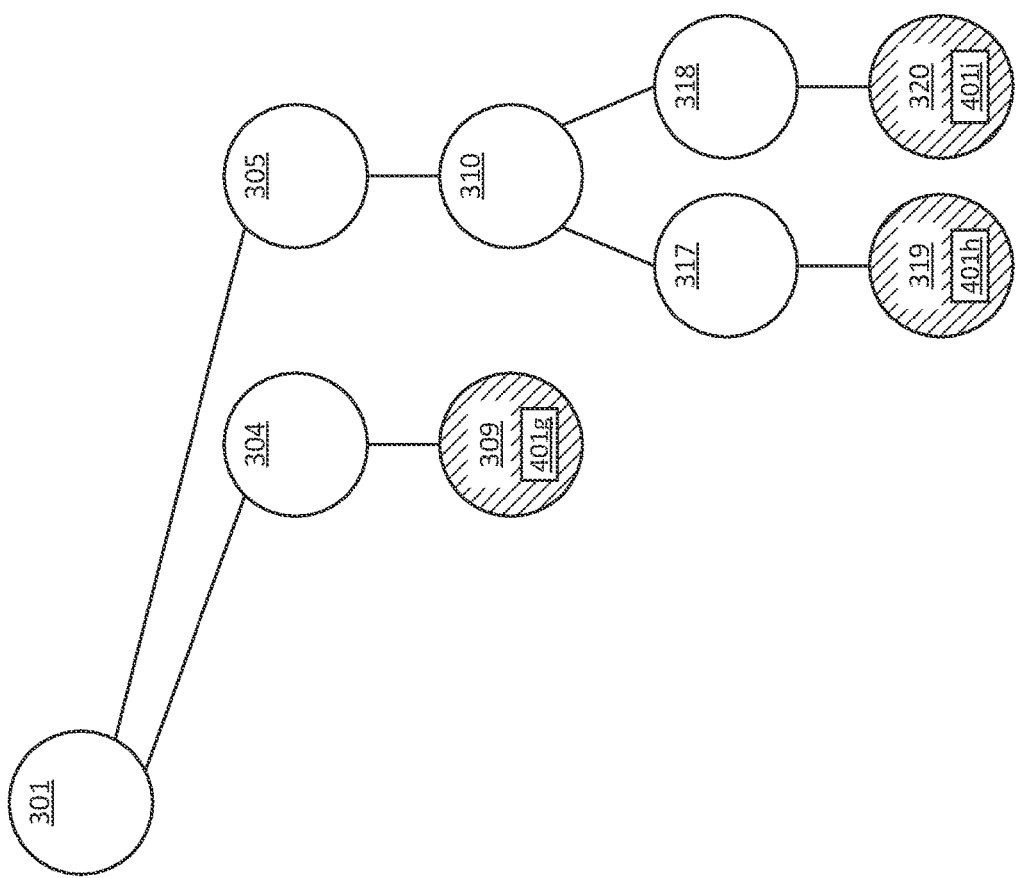

FIG. 4 illustrates an example 400 of an annotated configuration tree. In particular, example 400 shows the configuration tree of example 300, but has added an annotation to each leaf node of the configuration tree (i.e., annotation 401*a* for leaf node 311, annotation 401*b* for leaf node 312, annotation 401c for leaf node 313, annotation 401d for leaf node 314, annotation 401e for leaf node 315, annotation 401f for leaf node 316, annotation 401g for leaf node 309, annotation 401h for leaf node 319, and annotation 401i for leaf node 320). Using various shading patterns, example 400 also shows that, based on these annotations, a unique configurator can be determined for each annotated node. For example, a first configurator is associated with leaf node 311, a second configurator is associated with leaf nodes 312-314, a third configurator is associated with leaf nodes 315 and 316, and a fourth configurator is associated with leaf nodes 309, 319, and 320.

In embodiments, using a subtree generator 202, the anomalous configurator identifier 112 uses these annotations to generate configurator-specific subtrees from the configuration trees 114, with each configurator-specific subtree including the leaf node(s) that were configured by a specific configurator, plus all of their ancestors. For example, FIGS. 5A-5D illustrate examples 500a, 500b, 500c, and 500d of configurator-specific subtrees generated from the annotated configuration tree of FIG. 4. Example 500a illustrates a first configurator-specific subtree that includes leaf node 311 (and its ancestors), example 500b illustrates a second configurator-specific subtree that includes leaf nodes 312-314 (and their ancestors), example 500c illustrates a third configurator-specific subtree that includes leaf nodes 315 and 316 (and their ancestors), and example 500d illustrates a fourth configurator-specific subtree that includes leaf nodes 309, 319, and 320 (and their ancestors).

In embodiments, the subtree generator 202 generates a different set of subtrees for each configurator. For example, in FIG. 1, the subtree generator 202 generates subtrees 115 (shown as residing in storage media 104, in one embodiment), including a subtree set 115a corresponding to configurator 110a and a subtree set 115n corresponding to configurator 110m. Each subtree set includes a set of subtrees derived from a plurality of configuration trees in configuration trees 114. For example, subtree set 115a includes a first subtree of configuration tree 114a that includes leaf nodes (and their ancestors) configured by configurator 110a, and a first subtree of configuration tree 114n that includes leaf nodes (and their ancestors) configured by configurator 110a. Subtree set 115n, on the other hand, includes a second subtree of configuration tree 114a that includes leaf nodes (and their ancestors) configured by configurator 110m and a second subtree of configuration tree 114n that includes leaf nodes (and their ancestors) configured by configurator 110m.

Figure 6:
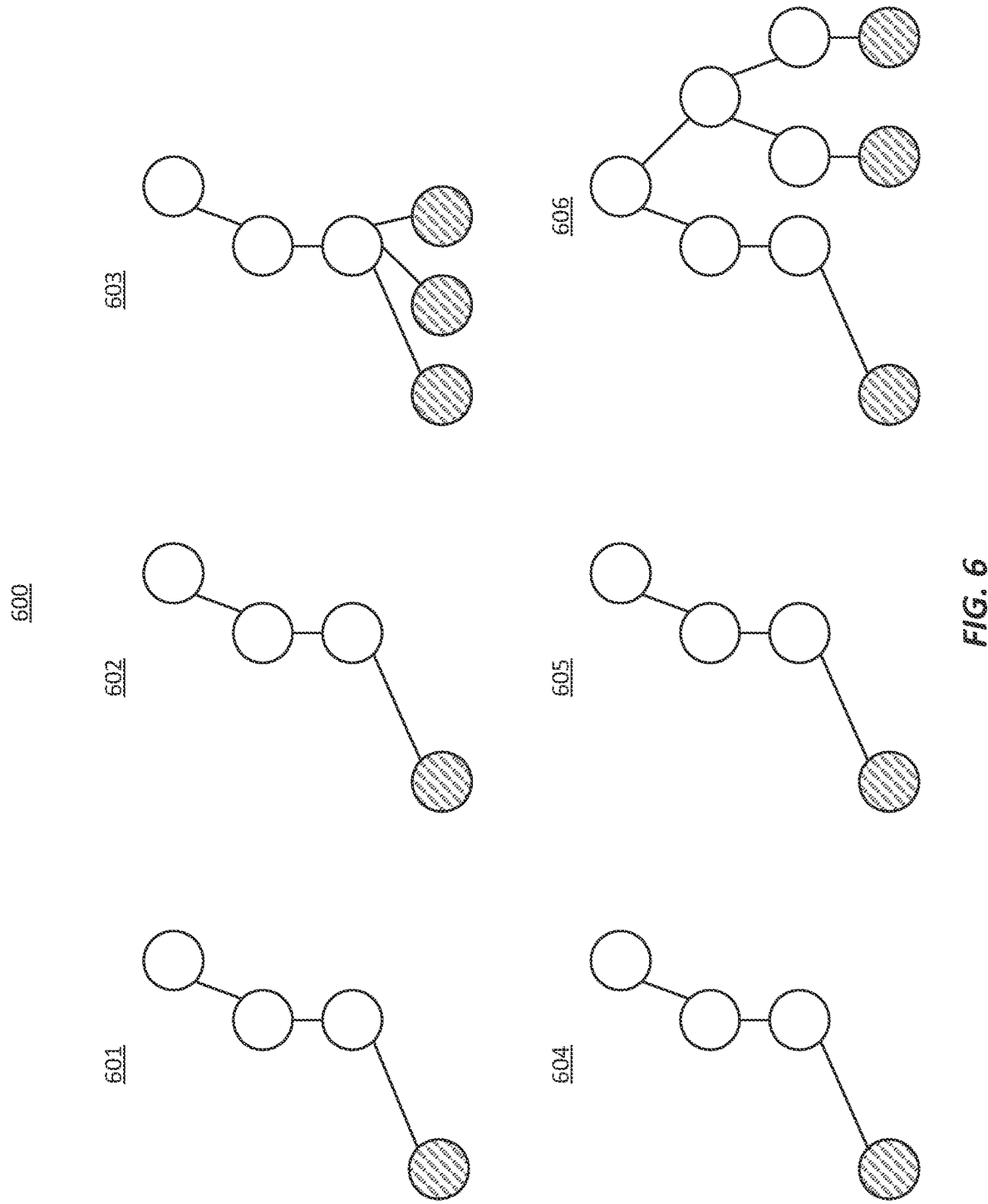
FIG. 6 illustrates an example of a set of subtrees for a specific configurator.

FIG. 6 illustrates an example 600 of a set of subtrees for a specific configurator. In example 600, there is a subtree 601 corresponding to a first configuration tree in configuration trees 114 that includes leaf nodes (and their ancestors) of the first configuration tree that were configured by a selected configurator, a subtree 602 corresponding to a second configuration tree in configuration trees 114 that includes leaf nodes (and their ancestors) of the second configuration tree that were configured by the selected configurator, a subtree 603 corresponding to a third configuration tree in configuration trees 114 that includes leaf nodes (and their ancestors) of the third configuration tree that were configured by the selected configurator, a subtree 604 corresponding to a fourth configuration tree in configuration trees 114 that includes leaf nodes (and their ancestors) of the fourth configuration tree that were configured by the selected configurator, a subtree 605 corresponding to a fifth configuration tree in configuration trees 114 that includes leaf nodes (and their ancestors) of the fifth configuration tree that were configured by the selected configurator, and a subtree 606 corresponding to a sixth configuration tree in configuration trees 114 that includes leaf nodes (and their ancestors) of the sixth configuration tree that were configured by the selected configurator.

In embodiments, when the configurators 110 are used properly, the set of subtrees generated for a given configurator are expected to have similarities. That is, all the configuration configured by a single configurator is generally expected to be similar for each configuration tree. Based on behavior, in embodiments, the subtrees of a configurator are expected to be similar, in the absence of anomalies. For example, referring to FIG. 6, subtrees 601-605 have similar structures, while subtree 606 has an entire branch not present in subtrees 601-605. This means that the configurator may have anomalously affected settings on the managed entity from which subtree 606 was derived, and could conflict with other configurators of that managed entity. Notably, due to its number of leaf nodes, conventional techniques (such as a textual comparison of a list of configuration parameters) would likely erroneously identify a configuration corresponding to subtree 603 as anomalous as well, since it contains a different number of configuration parameters than subtrees 601, 602, 604, and 605. However, the embodiments herein utilize a weighted edit distance calculation to ensure that subtree 603 is not erroneously identified as anomalous.

In embodiments, the similarity of two subtrees is represented using an edit distance. Thus, in embodiments, using an edit distance calculator 203, the anomalous configurator identifier 112 calculates a set of edit distances for one or more subtree sets generated by the subtree generator 202. For example, FIG. 1 shows one set of edit distances 116 for one configurator (e.g., edit distances calculated from subtree set 115a for configurator 110a), with ellipses indicating that the edit distance calculator 203 could calculate sets of edit distances for a plurality of configurators. There are a variety of techniques that can be used to calculate edit distances between trees, and which can be used according to the embodiments herein.

In embodiments, for a given subtree set, the edit distance calculator 203 calculates at least one corresponding edit distance for each unique pairing (i.e., nonrepeating combinations of two subtrees) in the subtree set. In the context of example 600, for instance, the edit distance calculator 203 calculates a first edit distance for a pairing of subtree 601 and subtree 602, a second edit distance for a pairing of subtree 601 and subtree 603, a third edit distance for a pairing of subtree 601 and subtree 604, a fourth edit distance for a pairing of subtree 601 and subtree 606, a fifth edit distance for a pairing of subtree 602 and subtree 603, a sixth edit distance for a pairing of subtree 602 and subtree 604, and so on, for a total of fifteen edit distances.

In embodiments, for the calculation of the edit distance, the cost of each node operation is weighted using a decreasing function of the node depth in the tree—i.e., a function that gives a higher weight to nodes that are closer to the root. In embodiments, this weighting is motivated (a) by the semantics of configuration trees, where intermediary nodes define configurable features/sub-features (e.g., where a non-leaf node closer to the root refers to a broader topic, and where a non-leaf node nearer to a leaf refers to a narrower topic), and the leaves parameters for the features/sub-features, and (b) since the configurators 110 typically configure the same features across the managed entities 108. Thus, a deviation between subtrees for a given configurator at a higher level could indicate that the configurator modified a feature that it would not normally modify. In embodiments, weighted edit distances are calculated based at least on a number of immediate children of a node (i.e., the weight given to a node increases with the number of its immediate children), a number of descendants of a node (i.e., the weight given to a node increases with the number of its descendants), and/or a depth of descendants of a node (i.e., the weight given to a node increases with the depth of its descendants).

In embodiments, a set of edit distances can be represented as a distance matrix. As will be appreciated by one of ordinary skill in the art, a distance matrix can be conceptualized as a two-dimensional array containing the distances, taken pairwise, between the elements of a set. Thus, in embodiments, using a distance matrix generator 204, the anomalous configurator identifier populates a corresponding distance matrix for one or more of the configurators 110, with each distance matrix containing weighted edit distances between unique pairs of subtrees in a set of subtrees for a configurator. For example, FIG. 1 shows distance matrix 117 for one configurator (e.g., configurator 110a) based on edit distances 116, with ellipses indicating that the distance matrix generator 204 could generate distance matrices for a plurality of configurators. In embodiments use of a distance matrix, as opposed to using one-to-one comparisons between subtrees, enables not only the identification of differences between two subtrees, but also the identification of clusters of subtrees, outlying subtrees, etc.

FIG. 8 illustrates an example 800 of a distance matrix, populated based on pairings of subtrees from example 600. In example 800, cells represent an edit distance (e.g., 801-815, 801'-815'), with each cell at the intersection of given pairing representing the calculated edit distance for the pairing. As shown in example 800, the edit distance for a given subtree and itself is zero. In some embodiments, each pairing has the same edit distance, regardless of the order of the paring (e.g., an edit distance 801 of the pairing subtree 602 and subtree 601 is the same as an edit distance 801' of the pairing subtree 601 and subtree 602). However, on other embodiments, swapping the order of the pairing may result in a different edit distance. It will be appreciated, in view of example 800, that while a distance matrix can be conceptualized a two-dimensional array, it need not be stored as such. For example, in embodiments only the identity of each subtree and values of edit distances 801-815 are stored, and the distance matrix is derived therefrom.

In embodiments, using an anomaly detector 205, the anomalous configurator identifier analyzes a distance matrix to determine if the distance matrix represents an anomalous subtree—and thus an anomalous configuration by a corresponding configurator. In embodiments, given a distance matrix, high pairwise values indicate significant differences between subtrees. When a subtree has a set of pairwise values (e.g., a set comprising one or more individual cell values for cells intersecting the subtree, a set comprising a row of cells corresponding to the subtree, a set comprising a column of cells corresponding to the subtree, a set comprising a row and a column of cells corresponding to the subtree), that are high relative to sets of pairwise values for other subtrees, there is an indication that this subtree is anomalous as compared to the other subtrees. Once an anomalous subtree has been identified, the anomaly detector 205 can determine which configurator applied an anomalous configuration (i.e., based on the subtree set to which subtree belongs), and to which managed entity (i.e., based on the configuration tree the subtree was generated from).

In embodiments, the anomaly detector 205 can use one or more of a variety of techniques to identify anomalous subtrees. In one technique, the anomaly detector 205 applies a threshold-based analysis, identifying an anomaly based on an edit distance exceeding a threshold. In some embodiments, this threshold is predetermined, while in other embodiments it is dynamically determined based on the values in the matrix. In some embodiments, the threshold is based on comparing first characteristics(s) of a set of pairwise values corresponding to one subtree, against second characteristic(s) of the full distance matrix and/or a subset of the distance matrix (e.g., the set difference of the distance matrix and the set of pairwise values corresponding to the subtree). Examples of the first characteristic(s) include an average of the set of pairwise values, a mean of the set of pairwise values, and/or a standard deviation of the set of pairwise values. Examples of the second characteristic(s) can similarly include any combination of an average, a mean, and/or a standard deviation of the values of the full distance matrix (and/or the subset of the distance matrix, as applicable). As one concrete example, the threshold may be set to a value reflecting second characteristics' mean(matrix)+(2*standard_deviation(matrix)), and the subtree value compared against this threshold may be set to a value reflecting first characteristics' mean(set of pairwise values).

In another technique, the anomaly detector 205 utilizes machine learning and classification of distance matrices (e.g., based on labelled distance matrices as training data). A variety of classification algorithms can be trained and applied, such as linear/logistic regression, support vector machine, random Forest, decision trees, k-nearest neighbor, stochastic gradient descent, and the like. In another technique, the anomaly detector 205 utilizes hierarchical clustering to identify clusters of similar trees, and thus anomalies.

In embodiments, using an anomaly data generator 206, the anomalous configurator identifier generates and stores (e.g., to memory 103 and/or storage media 104) a data structure when the anomaly detector 205 has detected an anomalous subtree. In embodiments, this data structure includes at least an identity of one or more configurators that applied anomalous configurations, and to which managed entity (or entities) an anomalous configuration was applied. In embodiments, the anomaly data generator 206 also generates an alert comprising at least a portion of this data structure. The form of the alert can vary, with examples being the opening of a service ticket, the generation of an email, the generation of a push notification, and the like. In embodiments, these alerts are sent to an administrator of computer architecture 100, enabling the administrator to remedy the cause of the anomaly and avoid future anomalies (e.g., by correcting a configuration of the configurators 110), and to correct any undesired configuration state that resulted from the anomaly (e.g., by correcting an anomalously applied configuration within the managed entities 108). This improves the functioning of computer architecture 100 by identifying and eliminating faults caused by the configurators 110, enables network services (e.g., provided by managed entities 108) to remain available and functioning properly, and improves the experience of network users (e.g., clients of managed entities 108).

In some embodiments, the anomalous configurator identifier 112 initiates an automatic remediation action for an anomaly. In some embodiments, an automatic remediation action is performed with respect to a configurator that made an anomalous configuration change. For example, an automatic remediation action could be disabling the configurator, isolating the configurator (e.g., using a firewall), decommissioning the configurator, and the like. In some embodiments, an automatic remediation action is performed with respect to a managed entity to which an anomalous configuration was applied. Examples include migrating a service away from the managed entity, rolling back a configuration of the managed entity to a prior state, isolating the managed entity, resetting the managed entity, decommissioning the managed entity, and the like.

The components of the anomalous configurator identifier 112 are now described in connection with FIG. 7, which illustrates a flow chart of an example method 700 for detecting an anomalous configurator of a plurality of managed entities. In embodiments, instructions for implementing method 700 are encoded as computer-executable instructions (e.g., anomalous configurator identifier 112) stored on a computer storage media (e.g., storage media 104) that are executable by a processor (e.g., processor 102) to cause a computer system (e.g., computer system 101) to perform method 700.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 7:
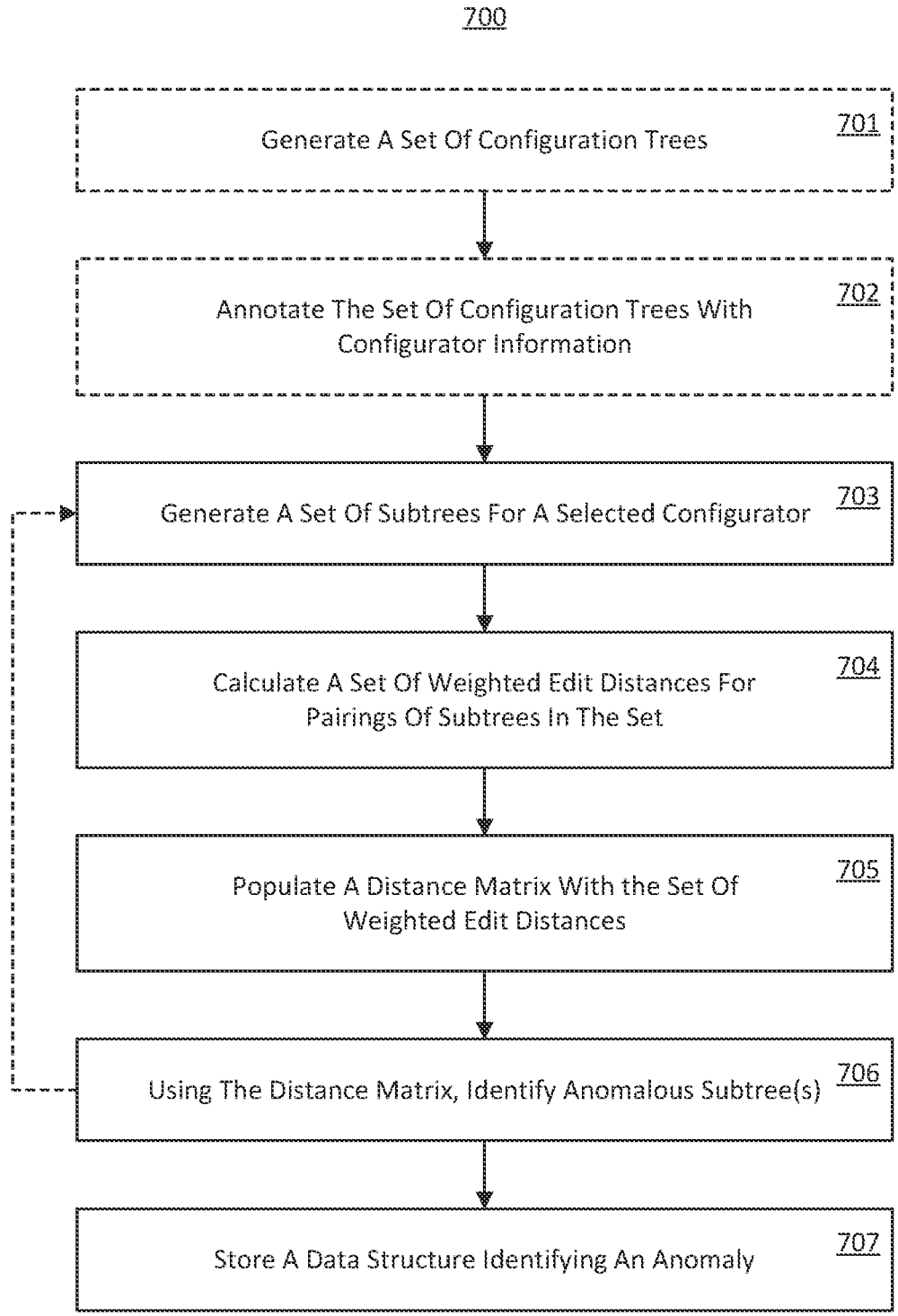
FIG. 7 illustrates a flow chart of an example method for detecting an anomalous configurator of a set of managed entities.

Referring to FIG. 7, in some embodiments, method 700 comprises an act 701 of generating a set of configuration trees. In some embodiments, act 701 comprises generating a plurality of configuration trees from telemetry data obtained from a plurality of managed entities. In an example, the configuration tree generator 111 generates configuration trees 114 from telemetry 113 received from the managed entities 108. In some embodiments, this telemetry 113 is received from each of managed entities 108 based on a request sent from the computer system 101 to the managed entity. In other embodiments, this telemetry 113 is received from each of managed entities 108 without a request from computer system 101, based on those managed entities pushing the telemetry 113 to the computer system 101. Act 701 is shown in broken lines, indicating that it may be an optional step for method 700. For example, in embodiments, the computer system 101 receives configuration trees 114 from other computer system(s), rather than generating them itself. Technical effects of act 701 include obtaining a representation of the configurations of the managed entities 108.

In some embodiments, 700 also comprises an act 702 of annotating the set of configuration trees with configurator information. In some embodiments, act 702 comprises annotating a plurality of configuration trees that each uses a hierarchical set of nodes to represent a set of configuration settings that has been applied to a corresponding managed entity in the plurality of managed entities, annotating each configuration tree including annotating one or more parameters represented by the configuration tree with information identifying a configurator that configured the parameter, the configurator being selected from among a plurality of configurators of the plurality of managed entities. In an example, the tree annotator 201 annotates at least a subset of configuration trees 114 with annotations that indicate, or that are usable to identify, which configurator modified at least a subset of parameters represented by the configuration tree. As shown in example 400, for instance, the illustrated configuration tree includes leaf nodes annotated to indicate three different configurators (i.e., a first configurator is associated with leaf node 311, a second configurator is associated with leaf nodes 312-314, and a third configurator is associated with leaf nodes 309, 319, and 320). Technical effects of act 702 include generating information sufficient to identify which configurator modified which parameters at a variety of managed entities.

In embodiments, the tree annotator 201 annotates leaf nodes, as demonstrated in example 400. Thus, in some embodiments of act 702, annotating one or more parameters represented by each configuration tree with information identifying a configurator that configured the parameter comprises annotating one or more leaf nodes in each configuration tree.

As discussed, in embodiments, annotations include a user (e.g., of a configurator) that applied the configuration, the location from where the configuration was applied, etc. Thus, in some embodiments of act 702, information identifying at least one configurator comprises at least one of a location from which a particular parameter was applied, or a user who applied the particular parameter. In embodiments, a location is specified as a remote networking device address (e.g., IP address, MAC address), a local console connection, etc. In embodiments, this is observed from telemetry obtained from a managed entity and/or from a configurator, a log stored at a managed entity and/or a configurator, a hook or a detour associated with an API used by a configurator, and the like. Thus, in some embodiments of act 702, the information identifying at least one configurator comprises the location from which the particular parameter was applied, and wherein the location comprises at least one of a specified network location or a specified console connection.

Act 702 is shown in broken lines, indicating that it may be an optional step for method 700. In these embodiments, method 700 includes identifying a plurality of configuration trees that each uses a hierarchical set of nodes to represent a set of configuration settings that has been applied to a corresponding managed entity in the plurality of managed entities, each configuration tree including one or more parameters that are annotated with information identifying a configurator that configured the parameter. In an example, the anomalous configurator identifier 112 identifies the plurality of configuration trees.

Method 700 comprises an act 703 of generating a set of subtrees for a selected configurator. In some embodiments, act 703 comprises based on a particular configurator of the plurality of configurators, generating a plurality of subtrees from the plurality of configuration trees, each subtree corresponding to a different configuration tree in the plurality of configuration trees and representing one or more configuration settings that were applied by the particular configurator. In an example, for a given configurator (e.g., configurator 110a), the subtree generator 202 generates subtree set 115a from the configuration trees 114. One example of subtree set 115a could be the subtrees 601-606 shown in example 600. Technical effects of act 703 include generation of data, across a plurality of managed entities, that indicates which settings a particular configurator modified on each managed entity.

Method 700 also comprises an act 704 of calculating a set of weighted edit distances for pairings of subtrees in the set. In some embodiments, act 704 comprises calculating a set of weighted edit distances from the plurality of subtrees, each weighted edit distance representing a degree of difference between a different pair of subtrees in the plurality of subtrees, each weighted edit distance being weighted based at least on a decreasing function of node depth within at least one subtree. In an example, the edit distance calculator 203 calculates edit distances 116 from parings of subtrees within subtree set 115a, which corresponds to configurator 110a. In embodiments, the set of weighted edit distances include a weighted edit distance for every unique pairing of subtrees in the plurality of subtrees. Technical effects of act 704 include numerically quantifying how similar the configurations that a given configurator to applied to managed entities are with one another.

As mentioned, in embodiments weighted edit distances may be calculated based on a number of immediate children of a node, a number of descendants of a node, and/or a depth of descendants of a node. Thus, in some embodiments of act 704, at least one weighted edit distance is also weighted based on at least one of a number of immediate children of a first node in at least one subtree in the different pair of subtrees, a number of descendants of a second node in at least one subtree in the different pair of subtrees, or a depth of descendants of a third node in at least one subtree in the different pair of subtrees.

Method 700 also comprises an act 705 of populating a distance matrix with the set of weighted edit distances. In some embodiments, act 705 comprises populating a distance matrix with the set of weighted edit distances. In an example, the distance matrix generator 204 populates distance matrix 117 with edit distances 116 derived from the subtree set 115a for configurator 110a. Technical effects of act 705 include assembling the weighted edit distances calculated in act 704 into a form that can be used to identify clusters of subtrees in a set (e.g., as being normal subtrees), outlying subtrees in a set (e.g., as being abnormal), etc.

Method 700 also comprises an act 706 of, using the distance matrix, identifying anomalous subtree(s). In some embodiments, act 706 comprises, using the distance matrix, identifying one or more anomalous subtrees within the plurality of subtrees. In an example, the anomaly detector 205 analyzes distance matrix 117 to identify one or more subtrees of subtree set 115a that are anomalous as compared to their peers. From there, the anomaly detector 205 can determine which configurator applied an anomalous configuration, and to which managed entity. Technical effects of act 706 include an automated detection that a configurator has made anomalous configuration settings change at a managed entity.

As mentioned, in embodiments, the anomaly detector 205 uses one or more of a variety of techniques to analyze a distance matrix and identify anomalous subtrees, such as a threshold-based analysis, machine learning and classification of distance matrices, and/or hierarchical clustering. Thus, in embodiments of act 706, identifying the one or more anomalous subtrees within the plurality of subtrees is based on at least one of determining that at least one weighted edit distance exceeds a threshold, inputting the distance matrix to a machine learning algorithm, or using hierarchical clustering to identify a non-clustered subtree. In some embodiments, identifying the one or more anomalous subtrees within the plurality of subtrees is based on inputting the distance matrix to a machine learning algorithm, and the machine learning algorithm is selected from a group consisting of a linear regression algorithm, a logistic regression algorithm, a support vector machine algorithm, a random forest algorithm, a decision trees algorithm, a k-nearest neighbor algorithm, or a stochastic gradient descent algorithm.

FIG. 7 includes a broken arrow that connects act 706 to act 703. This arrow indicates that act 703 to act 706 can repeat, while considering a different selected configurator each time. Thus, method 700 can generate and analyze subtrees for each configurator of configurators 110.

Method 700 also comprises an act 707 of storing a data structure identifying an anomaly. In some embodiments, act 707 comprises, based on identifying the one or more anomalous subtrees within the plurality of subtrees, storing a data structure that identifies at least (a) at least one of the one or more managed entities associated with the one or more anomalous subtrees, and (b) the particular configurator. In an example, the anomaly data generator 206 stores a data structure in memory 103 and/or storage media 104 that includes an identity of configurator 110a, and an identity of a managed entity to which the configurator 110a applied an anomalous configuration. Technical effects of act 707 include the generation of data usable to identify and remedy an anomaly.

In some embodiments, the anomaly data generator 206 also generates an alert that includes an identity of configurator 110a, and an identity of a managed entity to which the configurator 110a applied an anomalous configuration. In embodiments, this alert is a service ticket, an email, a push notification, and the like. Technical effects include alerting an administrator to the presence of an anomalous configurator, enabling the administrator to remedy the cause of the anomaly and avoid future anomalies (e.g., by correcting a configuration of the configurators 110), and to correct any undesired configuration state that resulted from the anomaly (e.g., by correcting an anomalously applied configuration within the managed entities 108).

In embodiments, the anomalous configurator identifier 112 initiates an automatic remediation action for an anomaly. For example, in some embodiments method 700 further comprises initiating an automatic remediation action, including at least one of: disabling the particular configurator; isolating the particular configurator; decommissioning the particular configurator; migrating a service away from at least one managed entity associated with the one or more anomalous subtrees; rolling back a configuration of at least one managed entity associated with the one or more anomalous subtrees; isolating at least one managed entity associated with the one or more anomalous subtrees; resetting at least one managed entity associated with the one or more anomalous subtrees; or decommissioning at least one managed entity associated with the one or more anomalous subtrees. Depending on the action taken, technical effects can include preventing further damage from a configurator that is making anomalous configuration changes, preventing use of services from an improperly configured managed entity, and reverting an anomalous configuration change.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system (e.g., computer system 101) that includes computer hardware, such as, for example, one or more processors (e.g., processor 102) and system memory (e.g., memory 103), as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. Such embodiments may include a data processing device comprising means for carrying out one or more of the methods described herein; a computer program comprising instructions which, when the program is executed by a computer, cause the computer to carry out one or more of the methods described herein; and/or a computer-readable medium comprising instructions which, when executed by a computer, cause the computer to carry out one or more of the methods described herein. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed is:

1. A method, implemented at a computer system that includes a processor, for detecting an anomalous configurator of a plurality of managed entities, the method comprising:
    identifying a plurality of configuration trees that each uses a hierarchical set of nodes to represent a set of configuration settings that has been applied to a corresponding managed entity in the plurality of managed entities, each configuration tree including one or more parameters that are annotated with information identifying a configurator that configured the parameter, the configurator being selected from among a plurality of configurators of the plurality of managed entities;
    based on a particular configurator of the plurality of configurators, generating a plurality of subtrees from the plurality of configuration trees, each subtree corresponding to a different configuration tree in the plurality of configuration trees and representing one or more configuration settings that were applied by the particular configurator;
    calculating a set of weighted edit distances from the plurality of subtrees, each weighted edit distance representing a degree of difference between a different pair of subtrees in the plurality of subtrees, each weighted edit distance being weighted based at least on a decreasing function of node depth within at least one subtree;
    populating a distance matrix with the set of weighted edit distances;
    using the distance matrix, identifying one or more anomalous subtrees within the plurality of subtrees;
    based on identifying the one or more anomalous subtrees within the plurality of subtrees, storing a data structure that identifies at least (a) at least one of the one or more managed entities associated with the one or more anomalous subtrees, and (b) the particular configurator; and
    initiating an automatic remediation action, including at least one of:
        disabling the particular configurator;
        decommissioning the particular configurator;
        migrating a service away from at least one managed entity associated with the one or more anomalous subtrees;
        rolling back a configuration of at least one managed entity associated with the one or more anomalous subtrees;
        resetting at least one managed entity associated with the one or more anomalous subtrees; or
        decommissioning at least one managed entity associated with the one or more anomalous subtrees.

2. The method of claim 1, further comprising generating the plurality of configuration trees from telemetry data obtained from the plurality of managed entities.

3. The method of claim 1, wherein initiating the automatic remediation action also includes at least one of:
    isolating the particular configurator; or
    isolating at least one managed entity associated with the one or more anomalous subtrees.

4. The method of claim 1, wherein information identifying at least one configurator comprises at least one of:
    a location from which a particular parameter was applied; or
    a user who applied the particular parameter.

5. The method of claim 4, wherein the information identifying at least one configurator comprises the location from which the particular parameter was applied, and wherein the location comprises at least one of:
    a specified network location; or
    a specified console connection.

6. The method of claim 1, wherein at least one weighted edit distance is also weighted based on at least one of:
    a number of immediate children of a first node in at least one subtree in the different pair of subtrees;
    a number of descendants of a second node in at least one subtree in the different pair of subtrees; or
    a depth of descendants of a third node in at least one subtree in the different pair of subtrees.

7. The method of claim 1, wherein identifying the one or more anomalous subtrees within the plurality of subtrees is based on at least one of:
    determining that at least one weighted edit distance exceeds a threshold;
    inputting the distance matrix to a machine learning algorithm; or
    using hierarchical clustering to identify a non-clustered subtree.

8. The method of claim 7, wherein identifying the one or more anomalous subtrees within the plurality of subtrees is based on inputting the distance matrix to a machine learning algorithm, and wherein the machine learning algorithm is selected from a group consisting of:
    a linear regression algorithm;
    a logistic regression algorithm;
    a support vector machine algorithm;
    a random forest algorithm;
    a decision trees algorithm;
    a k-nearest neighbor algorithm; or
    a stochastic gradient descent algorithm.

9. The method of claim 1, wherein the set of weighted edit distances include a weighted edit distance for every unique pairing of subtrees in the plurality of subtrees.

10. The method of claim 1, wherein annotating one or more parameters represented by each configuration tree with information identifying a configurator that configured the parameter comprises annotating one or more leaf nodes in each configuration tree.

11. The method of claim 1, further comprising annotating at least one configuration tree in the plurality of configuration trees with information identifying a configurator that configured a parameter.

12. The method of claim 1, further comprising generating an alert comprising at least (a) at least one of the one or more managed entities associated with the one or more anomalous subtrees, and (b) the particular configurator.

13. A computer system for detecting an anomalous configurator of a plurality of managed entities, comprising:
    a processor; and
    a computer storage media that stores computer-executable instructions that are executable by the processor to cause the computer system to at least:

identify a plurality of configuration trees that each uses a hierarchical set of nodes to represent a set of configuration settings that has been applied to a corresponding managed entity in the plurality of managed entities, each configuration tree including one or more parameters that are annotated with information identifying a configurator that configured the parameter, the configurator being selected from among a plurality of configurators of the plurality of managed entities;

based on a particular configurator of the plurality of configurators, generate a plurality of subtrees from the plurality of configuration trees, each subtree corresponding to a different configuration tree in the plurality of configuration trees and representing one or more configuration settings that were applied by the particular configurator;

calculate a set of weighted edit distances from the plurality of subtrees, each weighted edit distance representing a degree of difference between a different pair of subtrees in the plurality of subtrees, each weighted edit distance being weighted based at least on a decreasing function of node depth within at least one subtree;

populate a distance matrix with the set of weighted edit distances;

using the distance matrix, identify one or more anomalous subtrees within the plurality of subtrees;

based on identifying the one or more anomalous subtrees within the plurality of subtrees, store a data structure that identifies at least (a) at least one of the one or more managed entities associated with the one or more anomalous subtrees, and (b) the particular configurator; and initiate an automatic remediation action, including at least one of:
  disabling the particular configurator;
  decommissioning the particular configurator;
  migrating a service away from at least one managed entity associated with the one or more anomalous subtrees;
  rolling back a configuration of at least one managed entity associated with the one or more anomalous subtrees;
  resetting at least one managed entity associated with the one or more anomalous subtrees; or
  decommissioning at least one managed entity associated with the one or more anomalous subtrees.

14. The computer system of claim 13, wherein information identifying at least one configurator comprises at least one of:
  a location from which a particular parameter was applied; or
  a user who applied the particular parameter.

15. The computer system of claim 13, wherein at least one weighted edit distance is also weighted based on at least one of:
  a number of immediate children of a first node in at least one subtree in the different pair of subtrees;
  a number of descendants of a second node in at least one subtree in the different pair of subtrees; or
  a depth of descendants of a third node in at least one subtree in the different pair of subtrees.

16. The computer system of claim 13, wherein identifying the one or more anomalous subtrees within the plurality of subtrees is based on at least one of:

determining that at least one weighted edit distance exceeds a threshold;
inputting the distance matrix to a machine learning algorithm; or
using hierarchical clustering to identify a non-clustered subtree.

17. The computer system of claim 13, wherein the set of weighted edit distances include a weighted edit distance for every unique pairing of subtrees in the plurality of subtrees.

18. The computer system of claim 13, wherein annotating one or more parameters represented by each configuration tree with information identifying a configurator that configured the parameter comprises annotating one or more leaf nodes in each configuration tree.

19. The computer system of claim 13, wherein the computer-executable instructions are also executable by the processor to cause the computer system to annotate at least one configuration tree in the plurality of configuration trees with information identifying a configurator that configured a parameter.

20. A computer hardware storage device that stores computer-executable instructions that are executable by a processor to cause a computer system to at least:
  identify a plurality of configuration trees that each uses a hierarchical set of nodes to represent a set of configuration settings that has been applied to a corresponding managed entity in the plurality of managed entities, each configuration tree including one or more parameters that are annotated with information identifying a configurator that configured the parameter, the configurator being selected from among a plurality of configurators of the plurality of managed entities;
  based on a particular configurator of the plurality of configurators, generate a plurality of subtrees from the plurality of configuration trees, each subtree corresponding to a different configuration tree in the plurality of configuration trees and representing one or more configuration settings that were applied by the particular configurator;
  calculate a set of weighted edit distances from the plurality of subtrees, each weighted edit distance representing a degree of difference between a different pair of subtrees in the plurality of subtrees, each weighted edit distance being weighted based at least on a decreasing function of node depth within at least one subtree;
  populate a distance matrix with the set of weighted edit distances;
  using the distance matrix, identify one or more anomalous subtrees within the plurality of subtrees;
  based on identifying the one or more anomalous subtrees within the plurality of subtrees, store a data structure that identifies at least (a) at least one of the one or more managed entities associated with the one or more anomalous subtrees, and (b) the particular configurator; and
  initiate an automatic remediation action, including at least one of:
    disabling the particular configurator;
    decommissioning the particular configurator;
    migrating a service away from at least one managed entity associated with the one or more anomalous subtrees;
    rolling back a configuration of at least one managed entity associated with the one or more anomalous subtrees;

resetting at least one managed entity associated with the one or more anomalous subtrees; or decommissioning at least one managed entity associated with the one or more anomalous subtrees.

\* \* \* \* \*